United States Patent [19]

Ikejiri et al.

[11] Patent Number: 5,072,587

[45] Date of Patent: * Dec. 17, 1991

[54] HYDRAULICALLY OPERATED CONTINUOUSLY VARIABLE TRANSMISSION

[75] Inventors: Kenichi Ikejiri; Eiichiro Kawahara; Mitsumasa Furumoto, all of Saitama, Japan

[73] Assignee: Honda Giken Kogyo Kabushiki Kaisha, Tokyo, Japan

[*] Notice: The portion of the term of this patent subsequent to Sep. 12, 2006 has been disclaimed.

[21] Appl. No.: 394,215

[22] Filed: Aug. 15, 1989

Related U.S. Application Data

[63] Continuation of Ser. No. 130,750, Dec. 9, 1987, Pat. No. 4,864,823.

[30] Foreign Application Priority Data

Dec. 9, 1986 [JP] Japan ................................. 61-293068

[51] Int. Cl.$^5$ ............................................. F16D 39/00
[52] U.S. Cl. ............................................. 60/488; 60/487
[58] Field of Search ................. 60/487, 488, 489, 490, 60/491, 492; 91/499, 505, 506; 184/7; 417/213

[56] References Cited

U.S. PATENT DOCUMENTS

| | | | |
|---|---|---|---|
| 3,161,023 | 12/1964 | Margolin | 60/488 |
| 3,449,912 | 6/1969 | Dunikowski | 60/465 |
| 3,455,184 | 7/1969 | Frandsen | 74/880 |
| 3,555,817 | 1/1971 | Hann | 60/444 |
| 4,087,969 | 5/1978 | Takahashi | 60/464 |
| 4,170,153 | 10/1979 | Mizuno et al. | 74/868 |
| 4,187,877 | 2/1980 | Hodgson | 137/596 |
| 4,444,093 | 4/1984 | Koga | 91/488 |
| 4,478,134 | 10/1984 | Kawahara | 91/488 |
| 4,548,036 | 10/1985 | Matsuda | 60/464 |
| 4,631,980 | 12/1986 | Ishimori | 74/730 |
| 4,699,571 | 10/1987 | Bartholomaus | 417/213 |
| 4,730,518 | 3/1988 | Miyawaki | 74/866 |
| 4,838,024 | 6/1989 | Yamamoto et al. | 60/488 |
| 4,846,046 | 7/1989 | Kanai et al. | 91/506 |
| 4,858,435 | 8/1989 | Ikeda | 60/490 X |
| 4,864,823 | 9/1989 | Ikejiri et al. | 60/488 |

FOREIGN PATENT DOCUMENTS

| | | |
|---|---|---|
| 2363762 | 12/1973 | Fed. Rep. of Germany . |
| 54-134252 | 10/1979 | Japan . |
| 54-134253 | 10/1979 | Japan . |
| 54-141948 | 11/1979 | Japan . |
| 55-1294 | 1/1980 | Japan . |
| 56-52659 | 5/1981 | Japan . |
| 56-143857 | 11/1981 | Japan . |
| 57-70968 | 5/1982 | Japan . |
| 57-76357 | 5/1982 | Japan . |
| 59-44535 | 10/1984 | Japan . |
| 62-127562 | 6/1987 | Japan . |

Primary Examiner—Edward K. Look
Assistant Examiner—John Ryznic
Attorney, Agent, or Firm—Lyon & Lyon

[57] ABSTRACT

A hydraulically operated continuously variable transmission includes a hydraulic pump coupled to an input shaft, a hydraulic motor coupled to an output shaft, a closed hydraulic circuit interconnecting the hydraulic pump and the hydraulic motor, a hydraulic actuator for actuating a controlled member in the closed hydraulic circuit, an auxiliary pump connectable to the closed hydraulic circuit and the hydraulic actuator, a supply oil passage for supplying oil discharged from the auxiliary pump to the hydraulic actuator, and a control valve coupled between the supply oil passage, the closed hydraulic circuit, and an oil tank. The control valve comprises a hydraulic chamber communicating with the supply oil passage, a spring, and a spool disposed between the hydraulic chamber and the spring. The spool is movable, until the pressure of oil in the hydraulic chamber and the force of the spring are balanced, successively from a first position in which the supply oil passage and the closed hydraulic circuit are disconnected and the supply oil passage and the oil tank are disconnected, to a second position in which the supply oil passage and the closed hydraulic circuit are connected, to a third position in which the supply oil passage and the oil tank are connected, in response to an increase in the pressure of oil in the hydraulic chamber.

17 Claims, 10 Drawing Sheets

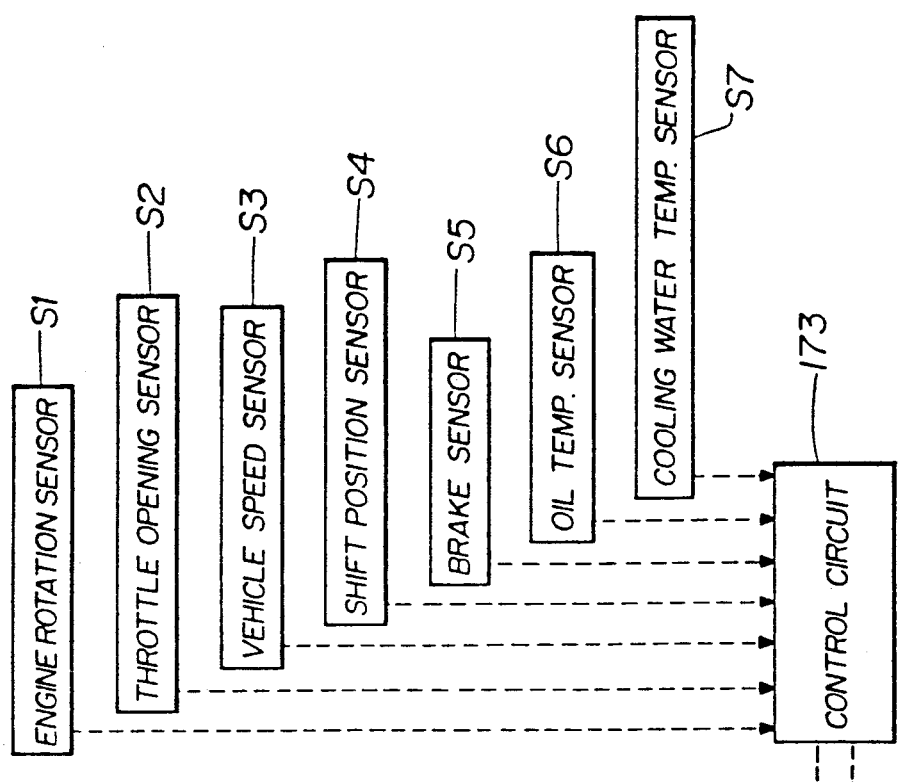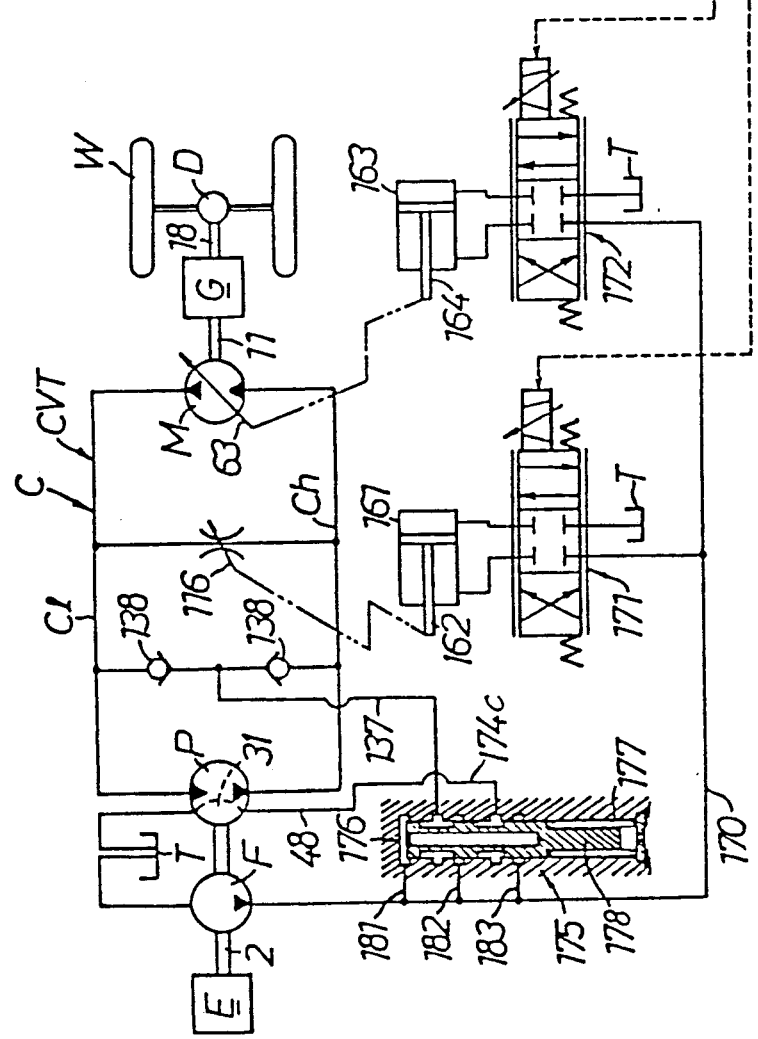
fig. 7.

HYDRAULICALLY OPERATED CONTINUOUSLY VARIABLE TRANSMISSION

CROSS REFERENCE TO RELATED APPLICATION

This application is a continuation of Applicants' copending application Ser. No. 130,750, filed Dec. 9, 1987, which application is pending and has been allowed, U.S. Pat. No. 4,864,823.

BACKGROUND OF THE INVENTION

The present invention relates to a hydraulically operated continuously variable transmission having a hydraulic pump coupled to an input shaft, a hydraulic motor coupled to an output shaft, the hydraulic pump and the hydraulic motor being interconnected by a closed hydraulic circuit, and an auxiliary pump connectable to the closed hydraulic circuit and hydraulic actuator's for operating controlled members in the closed hydraulic circuit.

Hydraulically operated continuously variable transmissions are known in the art as disclosed in Japanese Laid-Open Patent Publication No. 56-52659, for example.

In such hydraulically operated continuously variable transmissions, control oil is supplied to hydraulic actuators and replenishing oil is supplied to a closed hydraulic circuit by a common auxiliary pump. The supply of control oil is given priority over the supply of replenishing oil by means of a circuit compensating valve. When the amount of oil discharged from the auxiliary pump is large, the discharged oil is returned to an oil tank by a relief valve.

In order to give priority to the supply of replenishing oil to the closed hydraulic circuit over the return of oil to the oil tank and also to stabilize the operation of the hydraulic actuators at all times, it is necessary to keep the pressure of control oil at a substantially constant level. According to the conventional design, a pressure level set for the circuit compensating valve is slightly lower than a pressure level set for the relief valve.

However, the process of establishing such pressure levels is difficult to perform. Moreover, since the difference between the pressure levels thus set is very small, the pressure levels may easily be reversed even by a slight amount of fatigue-induced permanent setting of springs in the valves during long/usage. When this happens, oil is returned to the oil tank earlier than it is supplied to the closed hydraulic circuit, which therefore fails to be supplied with a sufficient amount of oil.

SUMMARY OF THE INVENTION

In view of the aforesaid drawback of conventional hydraulically operated continuously variable transmissions, it is an object of the present invention to provide a hydraulically operated continuously variable transmission in which the supply of replenishing oil to a closed hydraulic circuit is always given priority over the return of oil to an oil tank.

According to the present invention, there is provided a hydraulically operated continuously variable transmission comprising an input shaft, a hydraulic pump coupled to the input shaft, an output shaft, a hydraulic motor coupled to the output shaft, a closed hydraulic circuit interconnecting the hydraulic pump and the hydraulic motor, a hydraulic actuator for actuating a controlled member in the closed hydraulic circuit, an auxiliary pump connnectable to the closed hydraulic circuit and the hydraulic actuator, a supply oil passage for supplying oil discharged from the auxiliary pump to the hydraulic actuator, and a control valve coupled between the supply oil passage, the closed hydraulic circuit, and an oil tank, the control valve comprising a hydraulic chamber communicating with the supply oil passage, a spring, and a spool disposed between the hydraulic chamber and the spring and movable, until the pressure of oil in the hydraulic chamber and the force of the spring are balanced, successively from a first position in which the supply oil passage and the closed hydraulic circuit are disconnected and the supply oil passage and the oil tank are disconnected, to a second position in which the supply oil passage and the closed hydraulic circuit are connected, to a third position in which the supply oil passage and the oil tank are connected, in response to an increase in the pressure of oil in the hydraulic chamber.

According to the present invention, there is also provided a hydraulically operated continuously variable transmission comprising an input shaft, a hydraulic pump coupled to the input shaft, an output shaft, a hydraulic motor coupled to the output shaft, a closed hydraulic circuit interconnecting the hydraulic pump and the hydraulic motor, at least one of the hydraulic pump and the hydraulic motor having a chamber accommodating sliding surfaces therein, a hydraulic actuator for actuating a controlled member in the closed hydraulic circuit, an auxiliary pump connnectable to the closed hydraulic circuit and the hydraulic actuator through a supply oil passage, and a control valve coupled between the supply oil passage, the closed hydraulic circuit, and the chamber, the control valve being movable selectively to a first position in which the supply oil passage and the closed hydraulic circuit are connected when the pressure of oil in the supply oil passage exceeds a first pressure level, and a second position in which the supply oil passage and the chamber are connected when the pressure of oil in the supply oil passage exceeds a second pressure level higher than the first pressure level.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 is a circuit diagram of a hydraulic circuit arrangement of a hydraulically operated continuously variable transmission according to a still further embodiment of the present invention;

DESCRIPTION OF THE PREFERRED EMBODIMENTS

Figure 1:
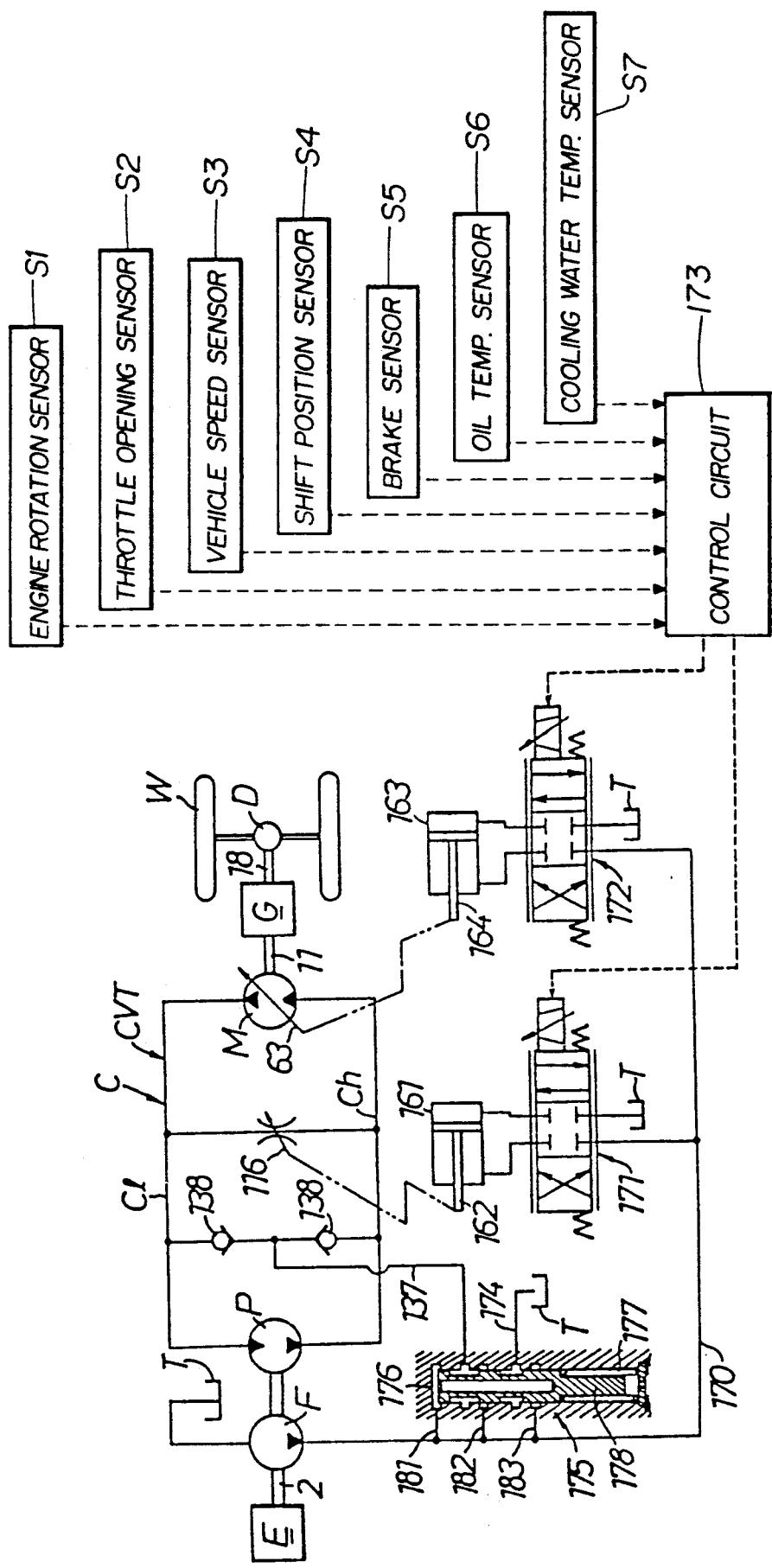
FIG. 1 is a circuit diagram of a hydraulic circuit arrangement of a hydraulically operated continuously variable transmission according to an embodiment of the present invention.

Like or corresponding parts are denoted by like or corresponding reference numerals throughout the several views.

FIG. 1 shows a hydraulically operated continuously variable transmission CVT according to an embodiment of the present invention for use on a motor vehicle such as an automobile, the transmission CVT basically comprising a hydraulic pump P of the fixed displacement type coupled to an input shaft 2 driven by an engine E and a hydraulic motor M of the variable displacement type disposed coaxially with the hydraulic pump P. The hydraulic pump P and the hydraulic motor M are coupled in a closed hydraulic circuit C. The hydraulic motor M is operatively coupled to wheels W through an output shaft 11, a forward/reverse gear assembly G, an auxiliary shaft 18, and a differential D.

The closed hydraulic circuit C includes a higher pressure oil passage Ch interconnecting the outlet port of the hydraulic pump P and the inlet port of the hydraulic motor M and a lower pressure oil passage Cl interconnecting the outlet port of the hydraulic motor M and the inlet port of the hydraulic pump P. The higher and lower pressure oil passages Ch, Cl are interconnected by a clutch valve 116 as a controlled member. To the clutch valve 116, there is coupled a piston rod 162 of a double-acting hydraulic cylinder 161 as a hydraulic actuator. The hydraulic motor M has a motor swash plate 63 as another controlled member, the motor swash plate 63 being coupled to a piston rod 164 of a double-acting hydraulic cylinder 163 as a hydraulic actuator.

The clutch valve 116 comprises a restriction valve switchable between an open position in which the higher and lower pressure oil passages Ch, Cl are interconnected and a fully closed position in which the higher and lower pressure oil passages Ch, Cl are disconnected from each other, the clutch valve 116 having an intermediate open position. When the clutch valve 116 interconnects the higher and lower pressure oil passages Ch, Cl, no working oil is supplied to the hydraulic motor M and hence the transmission is in a neutral condition with the hydraulic motor M being inoperative. When the clutch valve 116 disconnects the higher and lower pressure oil passages Ch, Cl from each other, working oil circulates between the hydraulic pump P and the hydraulic motor M to transmit driving power for thereby causing the motor vehicle to run. When the clutch valve 116 is in the intermediate open position, working oil circulates at a rate dependent on the opening of the clutch valve 116, which is thus held in a "partly engaged" condition. By turning the motor swash plate 63, the amount of oil discharged from the hydraulic motor M is varied to continuously vary the speed of rotation of the output shaft 11 and hence the wheels W.

The input shaft 2 is operatively coupled to an auxiliary or replenishing pump F having an outlet port connected to a supply oil passage 170. Between the supply oil passage 170, an oil tank T and the hydraulic cylinders 161, 163, there are connected directional control valves 171, 172 which are operated to control the directions of operation of the hydraulic cylinders 161, 163, i.e., operation of the motor swash plate 63 and the clutch valve 116. Operation of the directional control valves 171, 172 is controlled by a control circuit 173 in response to signals applied thereto from an engine rotation sensor S1, a throttle opening sensor S2, a vehicle speed sensor S3, a shift position sensor S4, a brake sensor S5, an oil temperature sensor S6, and an engine cooling water temperature sensor S7.

A replenishing oil passage 137 is connected to the closed hydraulic circuit C through a pair of check valves 138. A control valve 175 is coupled between the supply oil passage 170, the replenishing oil passage 137, and a release oil passage 174 leading to the oil tank T. The control valve 175 serves to regulate the pressure of oil in the supply oil passage 170 at a substantially constant pressure level. Furthermore, when the oil pressure in the supply oil passage 170 exceeds a certain pressure level, replenishing oil is supplied from the supply oil passage 170 via the replenishing oil passage 137 to the closed hydraulic circuit C. When the oil pressure in the supply oil passage 170 rises beyond a higher pressure level, the supply oil passage 170 is opened into the oil tank T.

The structure of the continuously variable transmission CVT will be described in detail with reference to FIG. 2. The continuously variable transmission CVT is housed in a transmission case 1 composed of a pair of longitudinally separate case members 1a, 1b.

The hydraulic pump P has a pump cylinder 4 splined at 3 to an input shaft 2, a plurality of cylinder holes or bores 5 defined in the pump cylinder 4 in a circular pattern around the input shaft 2, and a plurality of pump plungers 6 slidably fitted respectively in the cylinder holes 5. The power of the engine E is transmitted through a flywheel 7 to the input shaft 2.

The hydraulic motor M has a motor cylinder 8 disposed concentrically in surrounding relation to the pump cylinder 4 and rotatable relatively thereto, a plurality of cylinder holes or bores 9 defined in the motor cylinder 8 in a circular pattern around the center of rotation thereof, and a plurality of motor plungers 10 slidably fitted respectively in the cylinder holes 9.

The motor cylinder 8 has axially opposite ends on which output and support shafts 11, 12 are coaxially mounted, respectively. The output shaft 11 is rotatably supported on the axial end wall of the case member 1a by means of a needle bearing 13, and the support shaft 12 is rotatably supported on the axial end wall of the case member 1b by means of a ball bearing 14.

The input shaft 2 extends through the end wall of the case member 1a in a fluid-tight manner, and is disposed concentrically in the output shaft 11. A plurality of needle bearings 15 are disposed between the inner surface of the output shaft 11 and the outer surface of the input shaft 2, so that the input shaft 2 and the pump cylinder 4, and the output shaft 11 and the motor cylinder 8 are relatively rotatable.

Parallel to the output shaft 11, the auxiliary shaft 18 is rotatably supported on the opposite end walls of the transmission case 1 by a roller bearing 16 and a ball bearing 17. The forward/reverse gear assembly G is located between the auxiliary shaft 18 and the output shaft 11.

The forward/reverse gear assembly G comprises a pair of driver gears 19, 20 fixedly mounted on the output shaft 11, a driven gear 21 rotatably supported on the auxiliary shaft 18 in mesh with the driver gear 19, a driven gear 22 rotatably supported on the auxiliary shaft 18 in radial alignment with the other driver gear 20, an intermediate gear 23 meshing with the driver gear 20 and the driven gear 22, a driven clutch gear 24 fixed to the auxiliary shaft 18 between driver clutch gears 21a, 22a integral with the opposite surfaces of the driven gears 21, 22, and a clutch member 25 for selectively coupling the driver clutch gears 21a, 22a to the driven clutch gear 24. A shift fork 26 engages in the clutch member 25 for selectively moving the same axially into engagement with the driver clutch gear 21a and the driven clutch gear 24 or the driver clutch gear 22a and the driven clutch gear 24.

The auxiliary shaft 18 has an integral gear 28 held in mesh with an input gear 27 of the differential D. In response to operation of the clutch member 25, the differential D is operated selectively in forward and reverse directions of the motor vehicle.

A hydraulically hermetic chamber 31 is defined between the motor cylinder 8 and the pump cylinder 4, and a pump swash plate 32 is supported in the chamber 31 inwardly of the motor cylinder 8 in facing relation to the end face of the pump cylinder 4. An annular unitary pump shoe 33 is held in slidable contact with the pump swash plate 32.

The pump plungers 6 and the pump shoe 33 are relatively swingably coupled by connecting rods 44. A presser ring 34 supported on the motor cylinder 8 by a roller bearing 42 is held against an inner peripheral step of the pump shoe 33. A spring holder 35 is held against the presser ring 34, the spring holder 35 being coupled to the input shaft 2 through splines 36 which allow axial movement of the spring holder 35 on the input shaft 2 but prevent rotation of the spring holder 35 relatively to the input shaft 2. A coil spring 37 is disposed around the input shaft 2 between the spring holder 35 and the pump cylinder 4 for normally pressing the spring holder 35 to cause the presser ring 34 to push the pump shoe 33 resiliently toward the pump swash plate 32. The spring holder 35 has a partly spherical surface contacting a complementary partly spherical surface of the presser ring 34. Therefore, the spring holder 35 is neatly held against the presser ring 34 for transmitting the resilient force from the spring 37 to the presser ring 34.

The chamber 31 is divided into a first chamber 31a near the pump swash plate 32 and a second chamber 31b near the pump cylinder 4 by the pump shoe 33, the presser ring 34, and the spring holder 35.

The pump swash plate 32 and the pump shoe 33 have mutually sliding surfaces with their inner peripheral edges facing into the first chamber 31a, so that lubricating oil leaking from between these sliding surfaces flow into the first chamber 31a. To lubricate the sliding surfaces of the pump swash plate 32 and the pump shoe 33, an annular hydraulic pocket 38 is defined in the front surface of the pump shoe 33 and communicates through oil holes 39, 30, 41 defined in the pump shoe 33, the connecting rods 44, and the pump plungers 6 with pump chambers 45 defined between the pump plungers 6 and the pump cylinder 4. Therefore, oil under pressure in the pump chambers 45 is supplied through the oil holes 41, 40, 39 to the hydraulic pocket 38 for thereby lubricating the sliding surfaces of the pump shoe 33 and the pump swash plate 32. At the same time, oil pressure in the hydraulic pocket 38 is applied to the pump shoe 33 to bear the projecting thrust of the pump plungers 6, so that the pressure of contact between the pump shoe 33 and the pump swash plate 32 can be reduced.

An annular lubricating chamber 43 is defined around the sliding surfaces of the pump swash plate 32 and the pump shoe 33 by means of the motor cylinder 8, the pump swash plate 32, the pump shoe 33, and a roller bearing 42, the lubricating chamber 43 being part of the second chamber 31b.

Oil under pressure in the hydraulic pocket 38 leaks along the sliding surfaces of the pump shoe 33 and the pump swash plate 32 into the lubricating chamber 43 at all times. The oil that has thus leaked first fills the lubricating chamber 43 as lubricating oil, and then leaks into the second chamber 31b through the roller bearing 42. Therefore, the lubricating chamber 43 is always replenished with new lubricating oil which can reliably lubricate the sliding surfaces of the pump shoe 33 and the pump swash plate 32 even from outside of the pump shoe 33.

Into the second chamber 31b, oil flows from the lubricating chamber 43 and also lubricating oil from the sliding surfaces of the pump plungers 6 and the cylinder holes 5 and the sliding surfaces of the pump cylinder 4 and a distribution member 46.

The spring holder 35 has a passage 47 by which the first and second chambers 31a, 31b are held in communication with each other.

Intermeshing bevel gears 61, 62 are fixed respectively to the confronting ends of the pump cylinder 4 and the pump shoe 33. The bevel gears 61, 62 are synchronous gears having the same number of teeth. When the pump cylinder 4 is rotated by the input shaft 2, the pump shoe 33 is synchronously rotated through the bevel gears 61, 62. On rotation of the pump shoe 33, those pump plungers 6 which run along an ascending side of the inclined surface of the pump swash plate 32 are moved in a discharge stroke by the pump swash plate 32, the pump shoe 33, and the connecting rods 44, and those pump plungers 6 which travel along a descending side of the inclined surface of the pump swash plate 32 are moved in a suction stroke.

In the hydraulic motor M, the annular motor swash plate 63 confronting the motor cylinder 8 is fitted in an annular swash plate holder 64. The swash plate holder 64 has a pair of integral trunnions 65 projecting outwardly from its opposite sides and pivotally supported in the transmission case 1. Therefore, the motor swash plate 63 can be tilted together with the swash plate holder 64 about the axis of the trunnions 65.

The tip ends of the respective motor plungers 10 are relatively swingably coupled to a plurality of motor shoes 66 held in slidable contact with the motor swash plate 63. To keep the respective motor shoes 66 in slidable contact with the motor swash plate 63, a presser plate 67 which holds the backs of the motor shoes 66 is rotatably supported by a ring 69 fastened to the swash plate holder 64 by means of bolts 68. The motor shoes 66 and the motor plungers 10 where they are coupled project through the presser plate 67 at a plurality of circumferentially spaced positions. The presser plate 67 is therefore rotatable with the motor shoes 66.

Each of the motor shoes 66 has a hydraulic pocket 70 defined in its front face slidably contacting the motor swash plate 63. Oil chambers 71 defined between the closed ends of the cylinder holes 9 and the respective motor plungers 10 communicate with the corresponding hydraulic pockets 70 through joined oil holes 72, 73 defined in the motor plungers 10 and the motor shoes 66. Therefore, oil under pressure in the oil chambers 71 is supplied through the oil holes 72, 73 into the hydraulic pockets 70 to apply a pressure to the motor shoes 66 for bearing the projecting thrust of the motor plungers 10. The pressure thus applied to the motor shoes 66 reduces the pressure of contact between the motor shoes 66 and the motor swash plate 63, and causes oil to lubricate the sliding surfaces of the motor shoes 66 and the motor swash plate 63.

A cylindrical partition 74 is fitted against the inner peripheral surface of the swash plate holder 64 in confronting relation to the inner peripheral surface of the presser plate 67 with a small gap therebetween. The partition 74, the swash plate holder 64, and the presser plate 67 jointly define a lubricating chamber 75 accommodating the sliding surfaces, of the motor shoes 66 and the motor swash plate 63.

Oil under pressure in the respective hydraulic pockets 70 leaks along the sliding surfaces of the motor shoes 66 and the motor swash plate 63 at all times. The oil that has thus leaked first fills the lubricating chamber 75 as lubricating oil, and then leaks out through the gap around the presser plate 67. Therefore, the lubricating chamber 75 is always replenished with new lubricating oil which can reliably lubricate the sliding surfaces of the motor shoes 66 and the motor swash plate 63 even from outside of the motor shoes 66.

If the pressure in the lubricating chamber 75 approaches the pressure in the hydraulic pockets 70, the ability of the hydraulic pockets 70 to hydraulically support the motor shoes 66 would be impaired. To prevent this, the gap around the presser plate 67 is suitably selected dependent on the amount of oil leakage from the hydraulic pockets 70 so that the lubricating chamber 75 will hold oil under an approximately atmospheric pressure condition.

A servomotor 81 for tilting the swash plate holder 64, i.e., the motor swash plate 63, is disposed in the transmission case 1. The servomotor 81 comprises a servo cylinder 82 fixed to the transmission case 1, a servo piston 85 slidably disposed in the servo cylinder 82 and dividing the interior space of the servo cylinder 82 into a lefthand oil chamber 83 and a righthand oil chamber 84, a piston rod 86 integral with the servo piston 85 and movably extending through the end wall of the servo cylinder 82 near the lefthand oil chamber 83 in a fluid-tight manner, and a pilot valve 88 having an end slidably fitted in a valve hole 87 defined in the servo piston 85 and the piston rod 86 and movably extending through the end of the servo cylinder 82 near the righthand oil chamber 84 in a fluid-tight manner.

The piston rod 86 is coupled to the swash plate holder 64 by a pin 89. An oil passage 90 defined in the servo cylinder 82 is held in communication with the lefthand oil chamber 83 for supplying oil pressure to act on the servo piston 85. The servo piston 85 and the piston rod 86 have a passage 91 for bringing the righthand oil chamber 84 into communication with the valve hole 87 in response to rightward movement of the pilot valve 88, and a passage 92 for bringing the righthand oil chamber 84 into communication with the lefthand oil chamber 83 in response to leftward movement of the pilot valve 88. The valve hole 87 communicates with the oil tank at the bottom of the transmission case 1 through a return passage 93.

The servo piston 85 is operated in amplified movement by following the lefthand and righthand movement of the pilot valve 88 under the oil pressure from the oil passage 90. In response to movement of the servo piston 85, the swash plate holder 64, i.e., the motor swash plate 63, can be angularly shifted or adjusted between the most inclined position (as shown) and the right-angle position where the motor swash plate 63 lies perpendicular to the motor plungers 10. Upon rotation of the motor cylinder 8, the motor swash plate 63 reciprocally moves the motor plungers 10 into and out of the cylinder holes 9. The stroke of the motor plungers 10 can continuously be adjusted by the inclination of the motor swash plate 63.

The closed hydraulic circuit C is formed between the hyraulic pump P and the hydraulic motor M through the distribution member 46 and a distribution ring 97. When the pump cylinder 4 is rotated by the input shaft 2, high-pressure working oil discharged from the pump chambers 45 accommodating therein the pump plungers 6 in the discharge stroke flows into the oil chambers 71 of the cylinder holes 9 accommodating therein the motor plungers 10 which are in the expansion stroke. Working oil discharged from the oil chambers 71 accommodating therein the motor plungers 10 in the compression stroke flows back into the pump chambers 45 accommodating therein the pump plungers 6 in the suction stroke. During this time, the motor cylinder 8, i.e., the output shaft 11 is rotated by the sum of the reactive torque applied by the motor plungers 10 in the discharge stroke to the motor cylinder 8 through the motor swash plate 63 and the reactive torque received by the motor plungers 10 in the expansion stroke from the motor swash plate 63.

The transmission ratio of the motor cylinder 8 to the pump cylinder 4 is given by the following equation:

$$\text{Transmission ratio} = \frac{\text{Rotational speed of pump cylinder 4}}{\text{Rotational speed of motor cylinder 8}} =$$

$$1 + \frac{\text{Displacement of hydraulic motor } M}{\text{Displacement of hydraulic pump } P}$$

It can be understood from the above equation that the transmission ratio can be varied from 1 to a desired value by varying the displacement of the hydraulic motor M that is determined by the stroke of the motor plungers 10, from zero to a certain value.

The motor cylinder 8 comprises axially separate first through fourth members or segments 8a through 8d. The first member 8a includes the output shaft 11 as a unitary element, and accommodates the pump swash plate 32 therein. The cylinder holes 9 are defined in the second, third, and fourth members 8b through 8d. The third member 8c serves as the distribution member 46. The fourth member 8d has the support shaft 12 as a unitary element.

The first and second members 8a, 8b are coupled to each other by means of a plurality of bolts 98. The second, third, and fourth members 8b, 8c, 8d are relatively positioned by knock pins 99, 100 fitted in positioning holes defined in their mating end faces, and are firmly coupled together by means of a plurality of bolts 101.

The input shaft 2 has an inner end portion rotatably supported centrally in the distribution member 46 by a needle bearing 105. The pump cylinder 4 is resiliently held against the distribution member 46 by the spring 37.

A support plate 107 is fixed to an outer end surface of the case member 1b by means of bolts 106. To the support plate 107, there is securely coupled a cylindrical fixed shaft 108 projecting into the support shaft 12 of the motor cylinder 8. The distribution ring 97 slidably held against the distribution member 46 is eccentrically supported on the inner end of the fixed shaft 108. The distribution ring 97 divides an interior space 109 in the fourth member 8d of the motor cylinder 8 into an inner chamber 110 and an outer chamber 111. The distribution member 46 has an outlet port 112 and an inlet port 113. The outlet port 112 provides fluid communication between the pump chambers 45 that receive the pump plungers 6 operating in the discharge stroke and the inner chamber 110. The inlet port 113 provides fluid communication between the pump chambers 45 that receive the pump plungers 6 operating in the suction stroke and the outer chamber 111. The distribution member 46 also has a number of communication ports 114 defined therein and through which the oil chambers 71 of the motor cylinder 8 communicate with the inner chamber 110 or the outer chamber 111.

Therefore, upon rotation of the pump cylinder 4, high-pressure working oil discharged by the pump plungers 6 in the discharge stroke flows from the outlet port 112 via the inner chamber 110, and those communication ports 114 which communicate with the inner chamber 110 into the oil chambers 71 receiving the motor plungers 10 which are in the expansion stroke, thereby imposing a thrust on these motor plungers 10. Working oil discharged by the motor plungers 10 operating in the compression stroke flows through those communication ports 114 which communicate with the outer chamber 111 and the inlet port 113 into the pump chambers 45 receiving the pump plungers 6 in the suction stroke. Upon such circulation of the working oil, hydraulic power can be transmitted from the hydraulic pump P to the hydraulic motor M as described above.

The fixed shaft 108 has a peripheral wall having two, for example, radial bypass ports 115 through which the inner and outer chambers 110, 111 communicate with each other. The clutch valve 116 in the form of a cylindrical clutch valve is rotatably fitted in the fixed shaft 108 for selectively opening and closing the ports 115. The clutch valve 116 has valve holes 117 defined in its peripheral wall near the distal end thereof, and a control connector 119 on the opposite end to which a control shaft 118 coupled to the hydraulic cylinder 161 (see FIG. 1). The clutch valve 116 serves as a clutch for selectively connecting and disconnecting the hydraulic pump P and the hydraulic motor M.

When the clutch valve 116 is rotated about its own axis to fully open the valve holes 117 in full registry with the bypass ports 115, the clutch is in an "OFF" position. When the bypass ports 115 are fully closed by shifting the valve holes 117 out of registry therewith, the clutch is in an "ON" position. When the bypass ports 115 are partly opened by slightly shifting the valve holes 117, the clutch is in a "partly ON" (partly engaged) position. With the clutch OFF as shown, working oil discharged from the outlet port 112 into the inner chamber 110 flows through the bypass ports 115 and the outer chamber 111 directly into the inlet port 113, making the hydraulic motor M inoperative. When the clutch is ON, the above oil flow is shut off, and working oil is circulated from the hydraulic pump P to the hydraulic motor M, allowing hydraulic power to be transmitted from the hydraulic pump P to the hydraulic motor M.

The clutch valve 116 houses therein a hydraulic servomotor 121 actuatable by a pilot valve 120. The servomotor 121 has a servo piston 122 including a valve rod 123 which is of a diameter smaller than the inside diameter of the clutch valve 116. The valve rod 123 projects into the inner chamber 110 and has a distal end on which a closure valve 124 is pivotally mounted for closing the outlet port 112. When the servo piston 122 is moved to the left until the closure valve 124 is held closely against the distribution member 46, the outlet port 112 is closed. The outlet port 112 is closed when the motor swash plate 63 is vertically positioned (as viewed in FIG. 2) for the transmission ratio of 1. With he outlet port 112 closed, the pump plungers 6 are hydraulically locked to cause the pump cylinder 4 to mechanically drive the motor cylinder 8 through the pump plungers 6 and the pump swash plate 32. As a result, the thrust of the motor plungers 10 on the motor swash plate 63 is eliminated, and so is the load on the various bearings.

The fixed shaft 108 and the support plate 107 have an oil passage 139 communicating with the inner chamber 110 and an oil passage 140 communicating with the outer chamber 111. The support plate 107 has an oil passage 141 communicating with the oil passage 90 connected to the servomotor 81. A changeover valve 142 is disposed in the support plate 107 for selectively communicating the oil passages 139, 140 with the oil passage 141. The changeover valve 142 operates to communicate one of the oil passages 139, 140 which is of a higher oil pressure, with the oil passage 141. Therefore, the servomotor 81 for tilting the motor swash plate 63 of the hydraulic motor M is supplied with the higher oil pressure from the inner chamber 110 or the outer chamber 111.

The pilot valves 88, 120 of the respective servomotors 81, 121 are coupled to ends of links 127, 128, respectively. The other end of the link 127 is coupled to a rotatable shaft 129 which can be rotated about its own axis by the hydraulic cylinder 163 (see FIG. 1), the shaft 129 having a cam 130 supported thereon. The other end of the link 128 supports thereon a cam follower 131 slidingly contacting the cam 130. When the servomotor 81 is operated to vertically position the motor/swash plate 63, the servomotor 121 is operated by the link 127, the cam 130, the cam follower 131, and the link 128 to enable the closure valve 124 to close the outlet port 112.

The auxiliary pump F is mounted on an outer surface of the end wall of the case member 1a. The auxiliary pump F is driven by the input shaft 2 for feeding working oil from the oil tank on the bottom of the transmission case 1.

The auxiliary pump F has an outlet port 136 communicating with the supply oil passage 170 defined in the end wall of the case member 1a in order to be connected to the hydraulic cylinders 171, 172. The replenishing oil passage 137 is defined in the end wall of the case member 1a and the input shaft 2 and communicates with the inner chamber 110 through the check valve 138 and with the outer chamber 111 through the other check valve (not shown in FIG. 2). The release oil passage 174 opening into the transmission case 1 and leading to the oil tank T on the bottom of the transmission case 1 is defined in the end wall of the case member 1a.

The control valve 175 is disposed in the end wall of the case member 1a between the replenishing oil passage 137 and the release oil passage 174. The control valve 175 has a spool 178 movable until the oil pressure in a hydraulic chamber 176 communicating with the supply oil passage 170 and the force of a spring 177 tending to apply a force against the oil pressure in the hydraulic chamber 176 are balanced. The spool 178 of the control valve 175 is movable between a first position in which the supply oil passage 170, the replenishing oil passage 137, and the release oil passage 174 are disconnected from each other, a second position in which the supply oil passage 170 and the replenishing oil passage 137 are connected to each other, and a third position in which the supply oil passage 170 and the release oil passage 174 are connected to each other.

The end wall of the case member 1a has a bottomed hole 179 defined therein and having an axis normal to the axis of the input shaft 1. The spool 178 is slidably fitted in the hole 179, defining the hydraulic chamber 176 between itself and the bottom of the hole 179. A ring-shaped support member 180 is securely fitted in the open end of the bottomed hole 179, and the spring 177 is disposed between the support member 180 and the spool 178.

The hydraulic chamber 176 and the supply oil passage 170 are held in communication with each other by means of an oil passage 181, so that oil pressure is supplied from the supply oil passage 170 to the hydraulic chamber 176. The replenishing oil passage 137 and the release oil passage 174 are spaced from each other along the axis of the hole 179, with the replenishing oil passage 137 being located near the hydraulic chamber 176 and opening into the hole 179. An oil passage 182 communicating with the supply oil passage 170 opens into the hole 179 between the replenishing oil passage 137 and the release oil passage 174 in the axial direction of the hole 179. Another oil passage 183 communicates with the supply oil passage 170 and opens into the hole 179, the release oil passage 174 being positioned between the oil passages 182, 183 in the axial direction of the hole 179.

The spool 178 has defined in its outer circumferential surface an annular groove 184 which can provide communication between the oil passage 182 and the replenishing oil passage 137, and an annular groove 185 which can provide communication between the oil passage 183 and the release oil passage 174, the annular grooves 184, 185 being axially spaced from each other. Dependent on the position of the spool 178, the oil passage 182 and the replenishing oil passage 137 are selectively connected and disconnected, and the oil passage 183 and the release oil passage 174 are selectively connected and disconnected. More specifically, the spool 178 is axially slidable under the oil pressure in the hydraulic chamber 176 and the spring force of the spring 177. When the oil pressure in the hydraulic chamber 176 is low, the oil passage 182 and the replenishing oil passage 137 are disconnected, and the oil passage 183 and the release oil passage 174 are disconnected. When the oil pressure in the hydraulic chamber 176 is medium, the oil passage 182 and the replenishing oil passage 137 are connected, but the oil passage 183 and the release oil passage 174 remain disconnected. When the oil pressure in the hydraulic chamber 176 is high, the oil passage 183 and the release oil passage 174 are connected.

Figure 2:
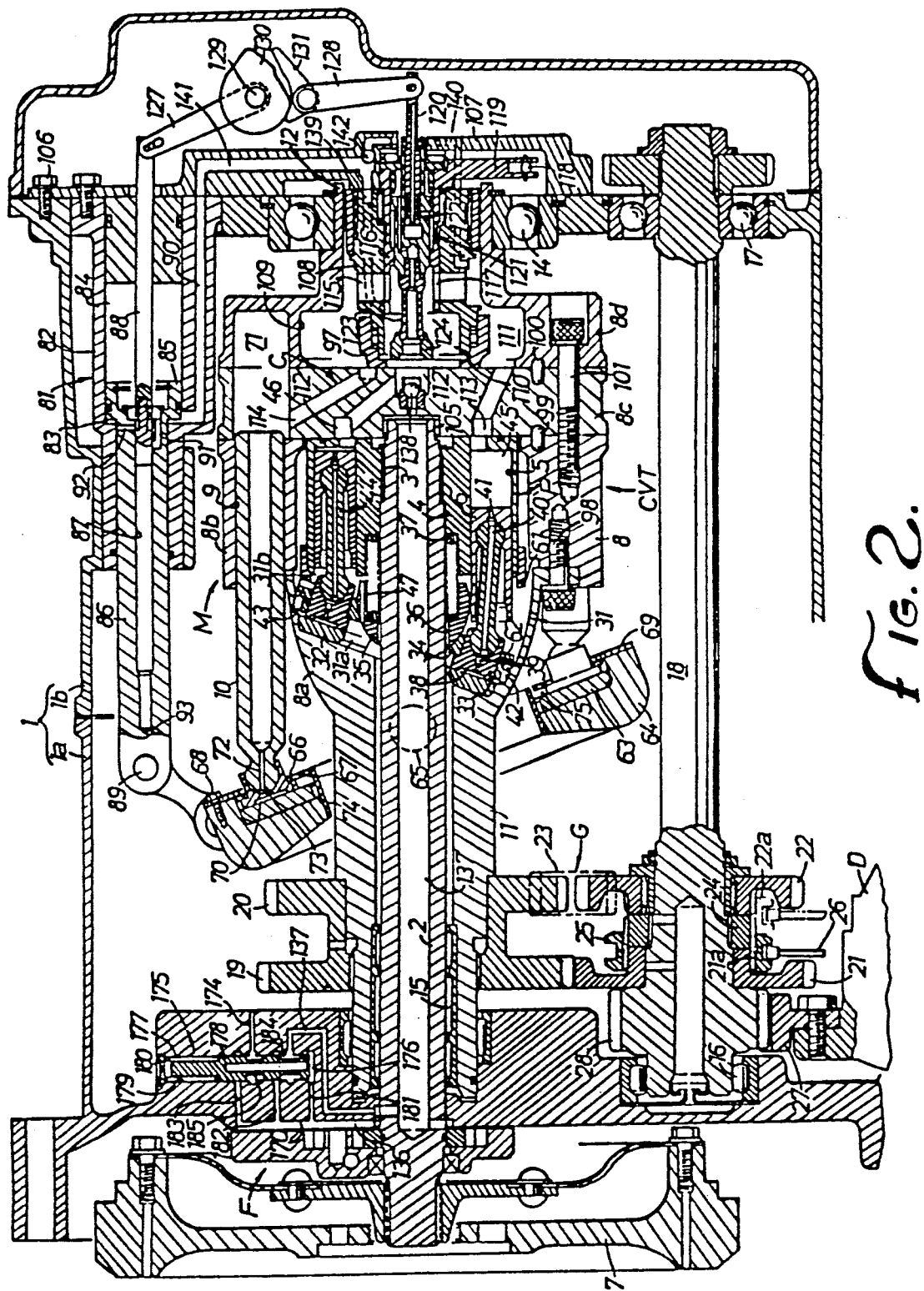
FIG. 2 is a longitudinal cross-sectional view of the hydraulically operated continuously variable transmission shown in FIG. 1.

Operation of the hydraulically operated continuously variable transmission shown in FIGS. 1 and 2 is as follows: The control valve 175 is operated until the oil pressure in the hydraulic chamber 176 and the spring force of the spring 170 are balanced. When the control oil pressure supplied to the hydraulic cylinders 161, 163, i.e., the oil pressure in the supply oil passage 170 is higher than a prescribed pressure level, the oil passage 182 and the replenishing oil passage 137 are brought into communication with each other to supply excess oil to closed hydraulic circuit C for thereby keeping the control oil pressure supplied to the hydraulic cylinders 161, 162 at a substantially constant level. If the oil pressure in the supply oil passage 170 remains high even with the excess oil supplied to the closed hydraulic circuit C, the spool 178 is moved until the oil passage 183 and the release oil passage 174 are communicated with each other, thus releasing the oil pressure in the supply oil passage 170 into the oil tank T. The oil pressure in the supply oil passage 170 is therefore maintained subtantially constant.

The position of the spool 178 in which the oil passage 182 and the replenishing oil, passage 137 communicate with each other, and the position thereof in which the oil passage 183 and the release oil passage 174 communicate with each other are determined by the oil pressure in the hydraulic chamber 176 with respect to the spring force of the spring 177. The small difference between the pressure levels for bringing the spool 178 to these positions can easily and accurately be obtained simply by selecting the positional relationship between the annular grooves 184, 185 and the oil passages 182, 183, 137, 174. Even if the spring 177 is subjected to permanent setting due to fatigue during long usage, when the oil pressure in the hydraulic chamber 176 is increased, the oil passage 182 and the replenishing oil passage 137 are brought into communication with each other at first. Therefore, the supply of replenishing oil to the closed hydraulic circuit C is always effected earlier than the release of oil to the oil tank T, so that the closed hydraulic circuit C will sufficiently be replenished with oil.

Figure 3:
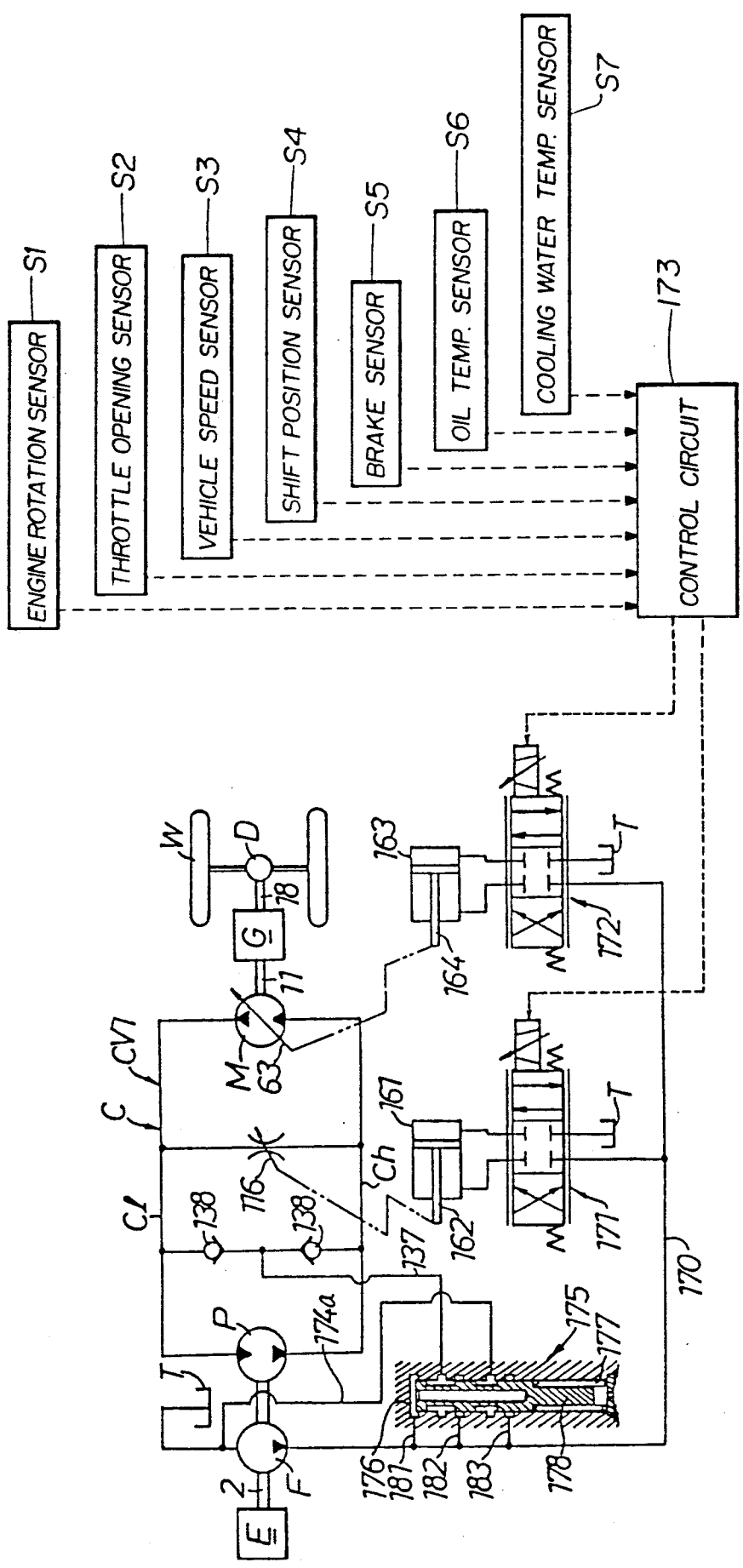
FIG. 3 is a circuit diagram of a hydraulic circuit arrangement of a hydraulically operated continuously variable transmission according to another embodiment of the present invention.

FIG. 3 shows a hydraulically operated continuously variable transmission according to another embodiment of the present invention. In this embodiment, a release oil passage 174a from the control valve 175 is connected to a junction between the inlet port of the auxiliary pump F and the oil tank T. This arrangement reduces resistance to the drawing of oil into the auxiliary pump F.

Figure 4:
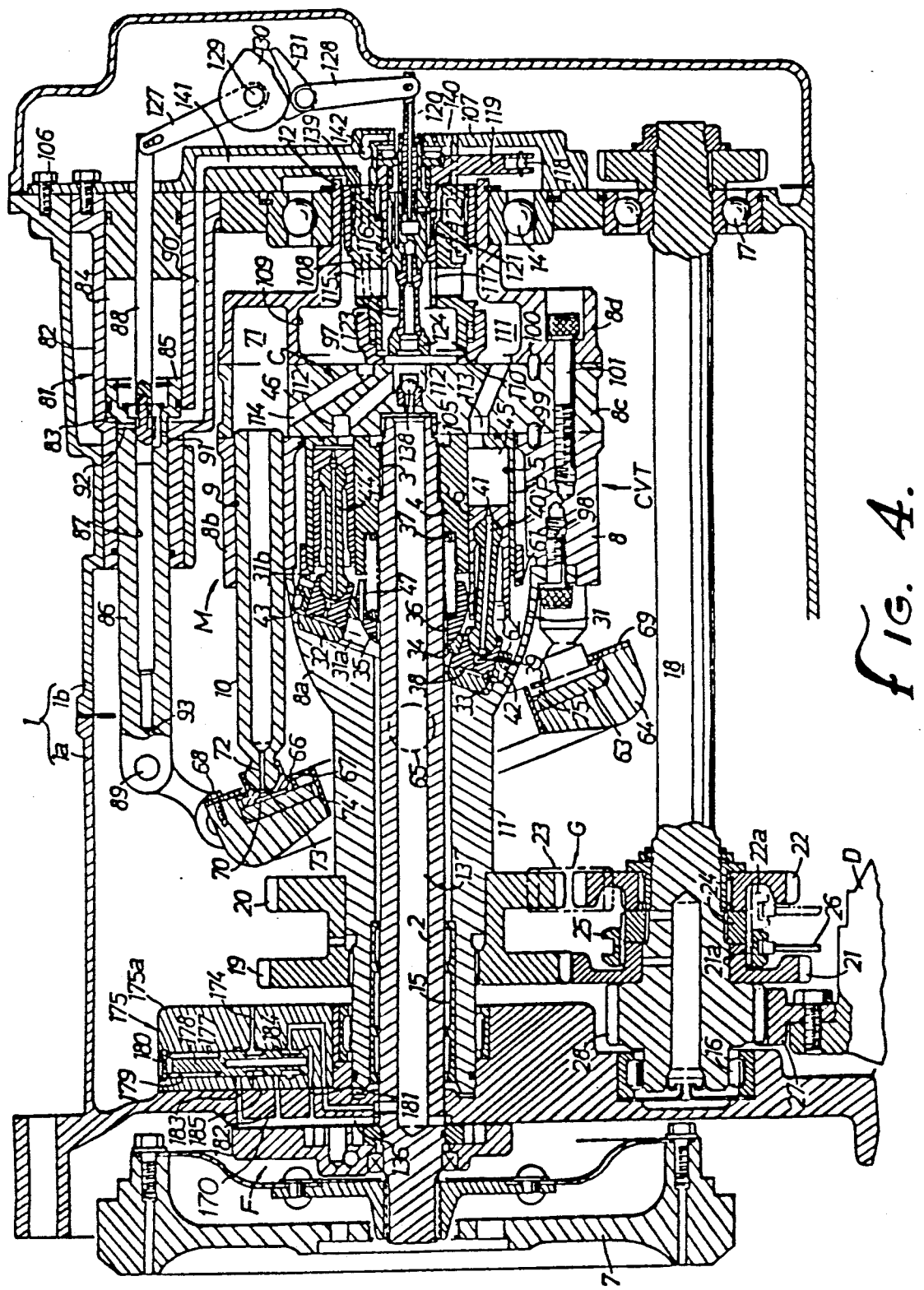
FIG. 4 is a longitudinal cross-sectional view of a hydraulically operated continuously variable transmission according to still another embodiment of the present invention.

FIG. 4 illustrates a hydraulically operated continuously variable transmission according to still another embodiment of the present invention. In FIG. 4, the control valve 175 has a main valve body or housing 175a separate from and attached to the case member 1a. With this structure, the control valve 175 can be assembled easily with higher efficiency.

Figure 5:
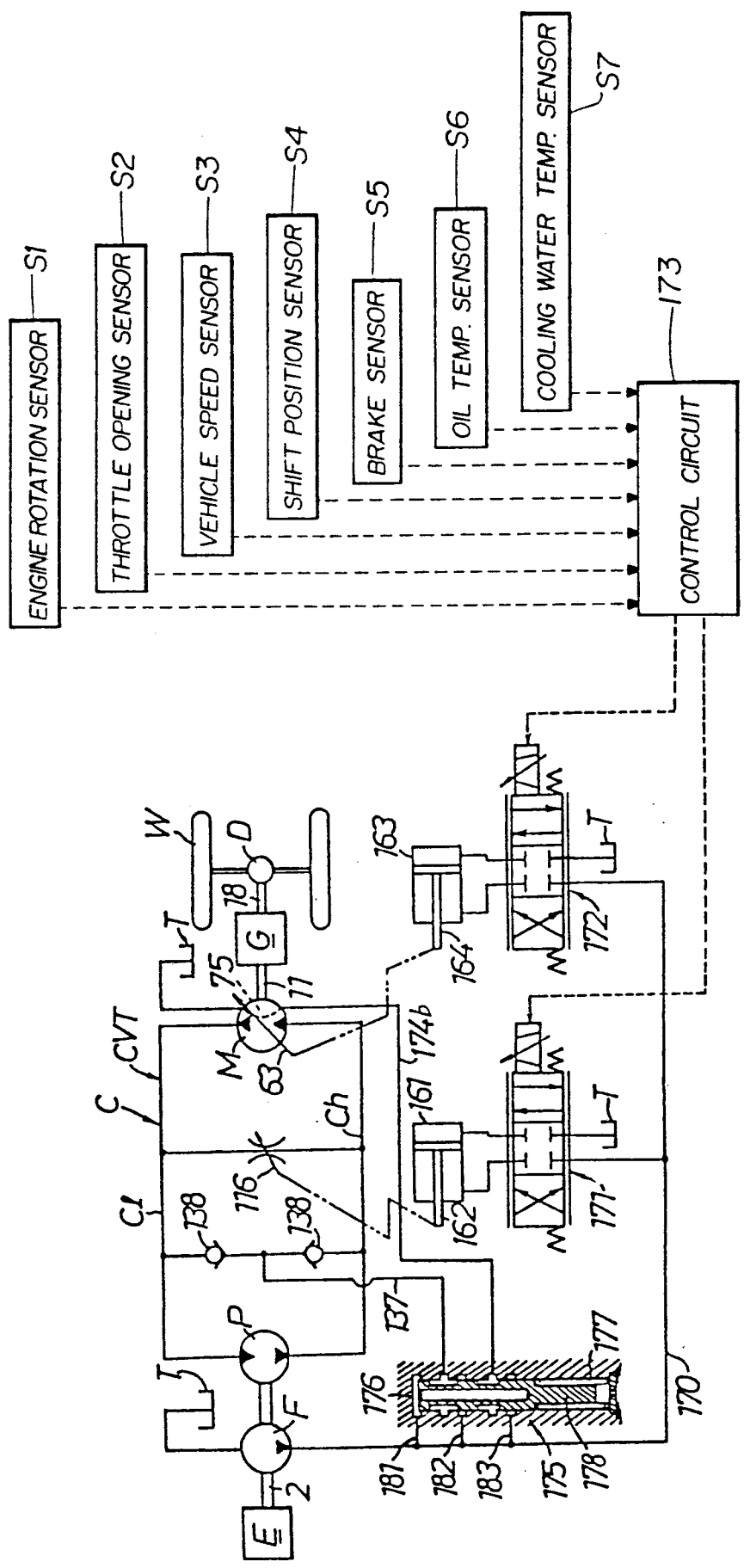
FIG. 5 is a circuit diagram of a hydraulic circuit arrangement of a hydraulically operated continuously variable transmission according to yet still another embodiment of the present invention.

According to yet still another embodiment shown in FIG. 5, a release oil passage 174b from the control valve 175 is connected to the oil tank T through the lubricating chamber 75 of the hydraulic motor M. When oil pressure in the supply oil passage 170 is high enough to move the spool 178 until the oil passage 183 communicates with the release oil passage 174b, excess oil is supplied from the supply oil passage 170 to the lubricating chamber 75. More specifically, when the amount of oil leaked from between the motor swash plate 63 and the motor shoe 66 is large, the lubricating chamber 75 is filled with lubricating oil. Therefore, since the amount of oil leakage from the closed hydraulic circuit C is large, a large amount of replenishing oil is supplied to the closed hydraulic circuit C, and the oil pressure in the supply oil passage 170 is lowered, thus reducing the amount of oil supplied to the lubricating chamber 75. Conversely, when the amount of oil leaked from between the motor swash plate 63 and the motor shoe 66 is small, the amount of oil leakage from the closed hydraulic circuit C is small. Inasmuch as the amount of oil supplied to the closed hydraulic circuit C is also small, the oil pressure in the closed hydraulic circuit C is not substantially lowered. Accordingly, the amount of oil supplied to the lubricating chamber 75 is increased. Regardless of the amount of oil leaked from between the motor swash plate 63 and the motor shoe 66, therefore, the lubricating chamber 75 retains a sufficient amount of oil.

Figure 6:
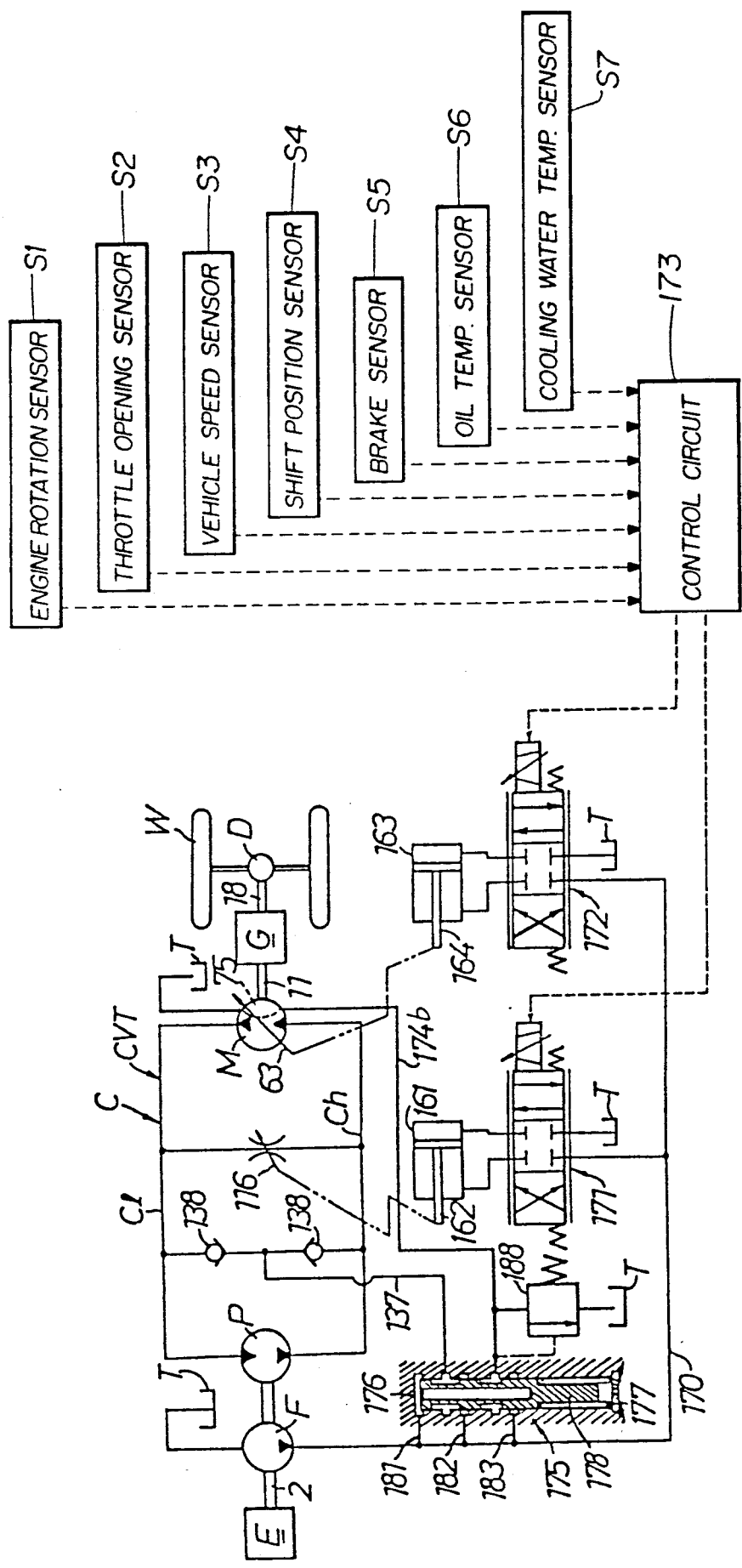
FIG. 6 is a circuit diagram of a hydraulic circuit arrangement of a hydraulically operated continuously variable transmission according to a further embodiment of the present invention.

A hydraulically operated continuously variable transmission according to yet still another embodiment shown in FIG. 6 differs from the transmission shown in FIG. 5 in that the release oil passage 174b between the control valve 175 and the lubricating chamber 75 is connected to the oil tank T via a relief valve 188 which is openable at a pressure level which is lower than the pressure level at which the oil passage 183 and the release oil passage 174b are brought into communication with each other by the spool 178. With the arrangement of FIG. 6, the oil pressure in the lubricating chamber 75 is prevented from becoming higher than the oil pressure in the supply oil passage 170. Therefore, the control valve 175 releases oil pressure normally to prevent the oil pressure discharged from the auxiliary pump F from being unduly increased. The power transmission efficiency is prevented from being lowered, and the hydraulic cylinders 161, 163 are allowed to operate smoothly.

Figure 8:
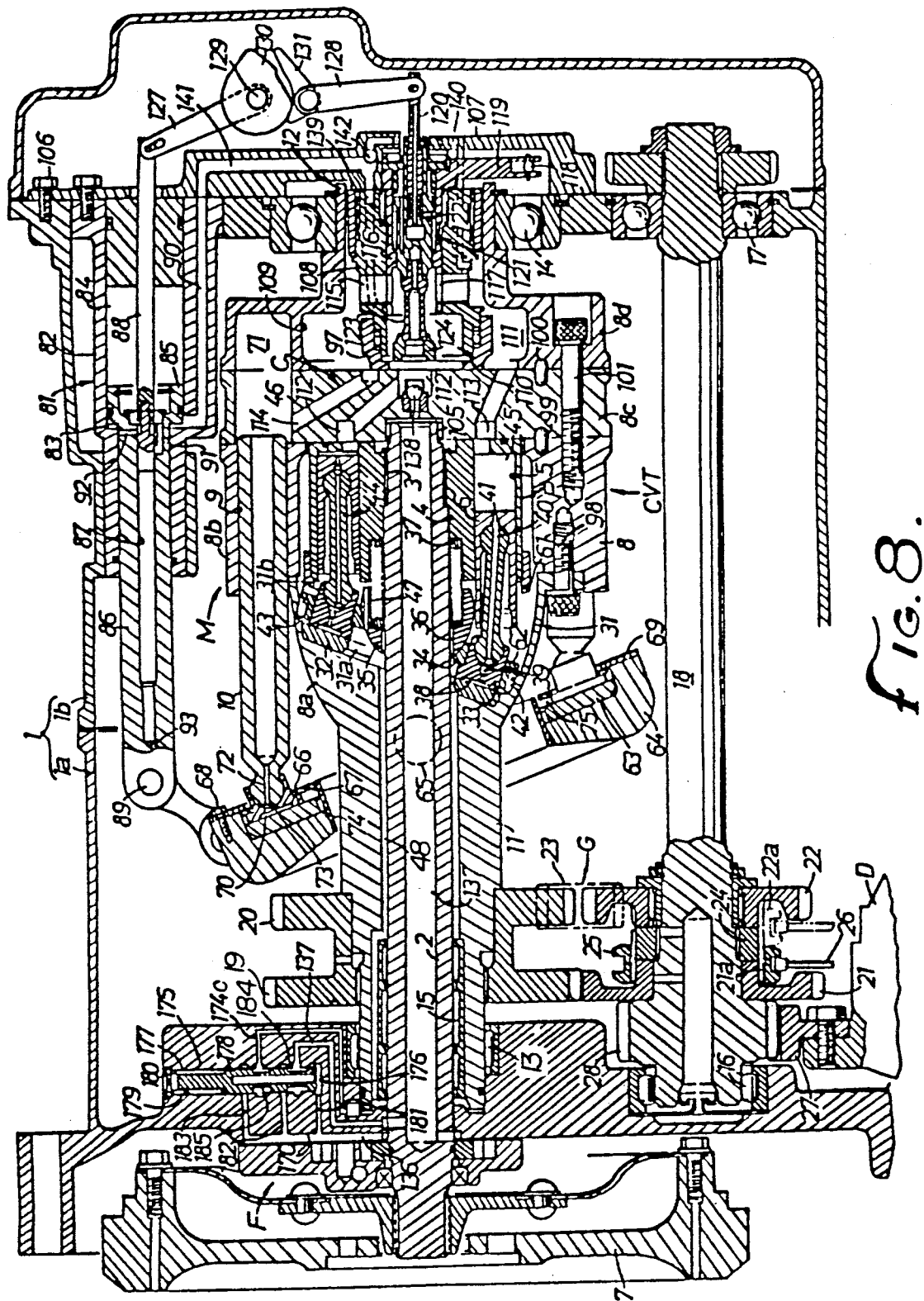
FIG. 8 is a longitudinal cross-sectional view of the hydraulically operated continuously variable transmission shown in FIG. 7.

FIGS. 7 and 8 show a hydraulically operated continuously variable transmission according to a further embodiment of the present invention. In this embodiment, a release oil passage 174c from the control valve 175 is connected through an oil passage 48 to the chamber 31 of the hydraulic pump P. As illustrated in FIG. 8, the oil passage 48 is defined between the input shaft 2 and the motor cylinder 8 and communicates the release oil passage 174c with the chamber 31. The motor cylinder 8 has a plurality of discharge holes 189 for discharging oil from the chamber 31. The discharge holes 189 are of such a small diameter as to hold a sufficient amount of lubricating oil within the chamber 31. With the arrangement of FIGS. 7 and 8, a sufficient amount of lubricating oil can be retained in the chamber 31.

Figure 9:
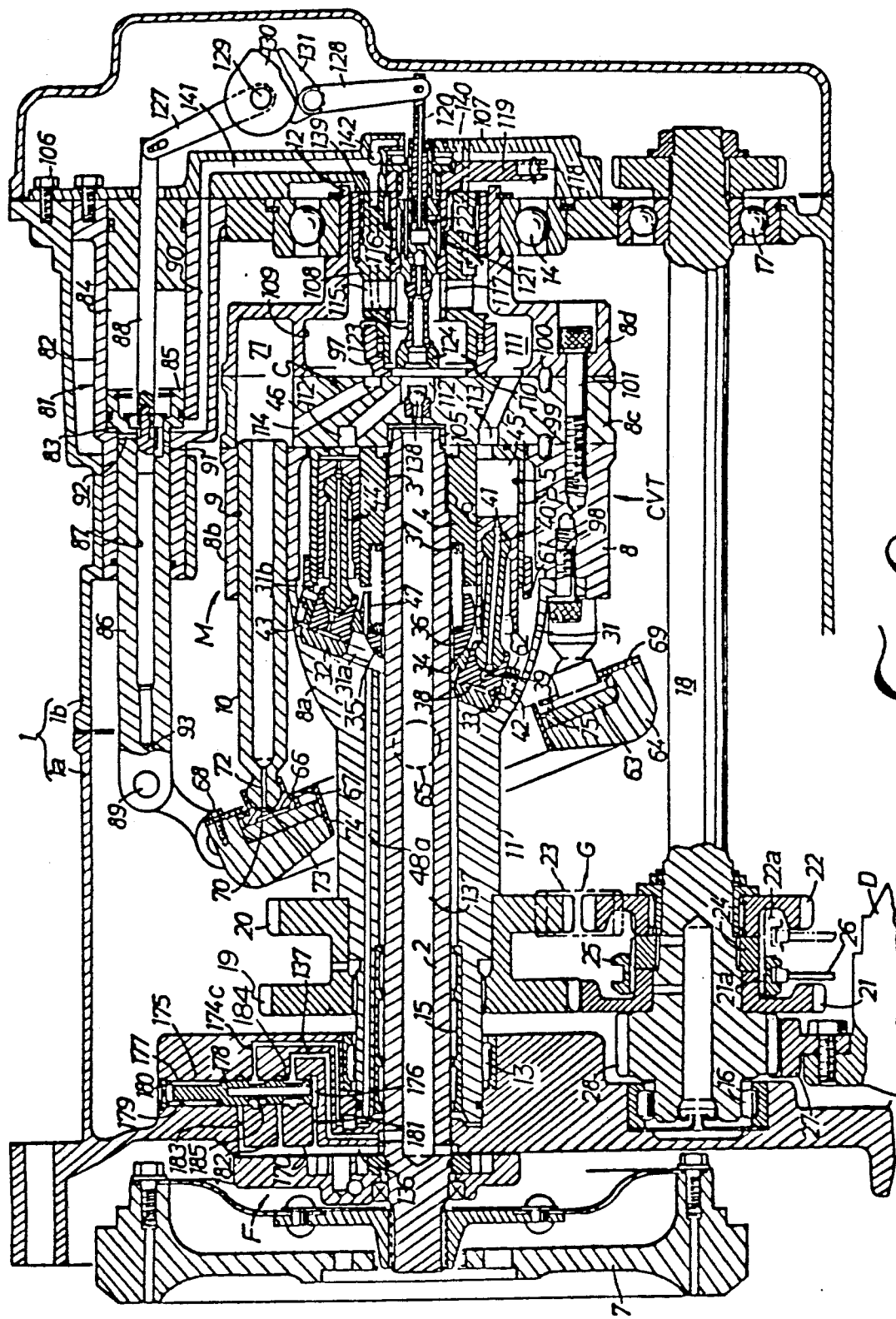
FIG. 9 is a longitudinal cross-sectional view of a hydraulically operated continuously variable transmission according to a yet further embodiment of the present invention.

FIG. 9 shows a hydraulically operated continuously variable transmission according to a still further embodiment of the present invention. According to this embodiment, an oil passage 48a is defined in the motor cylinder 8 and provides communication between the release oil passage 174c and the chamber 31.

Figure 10:
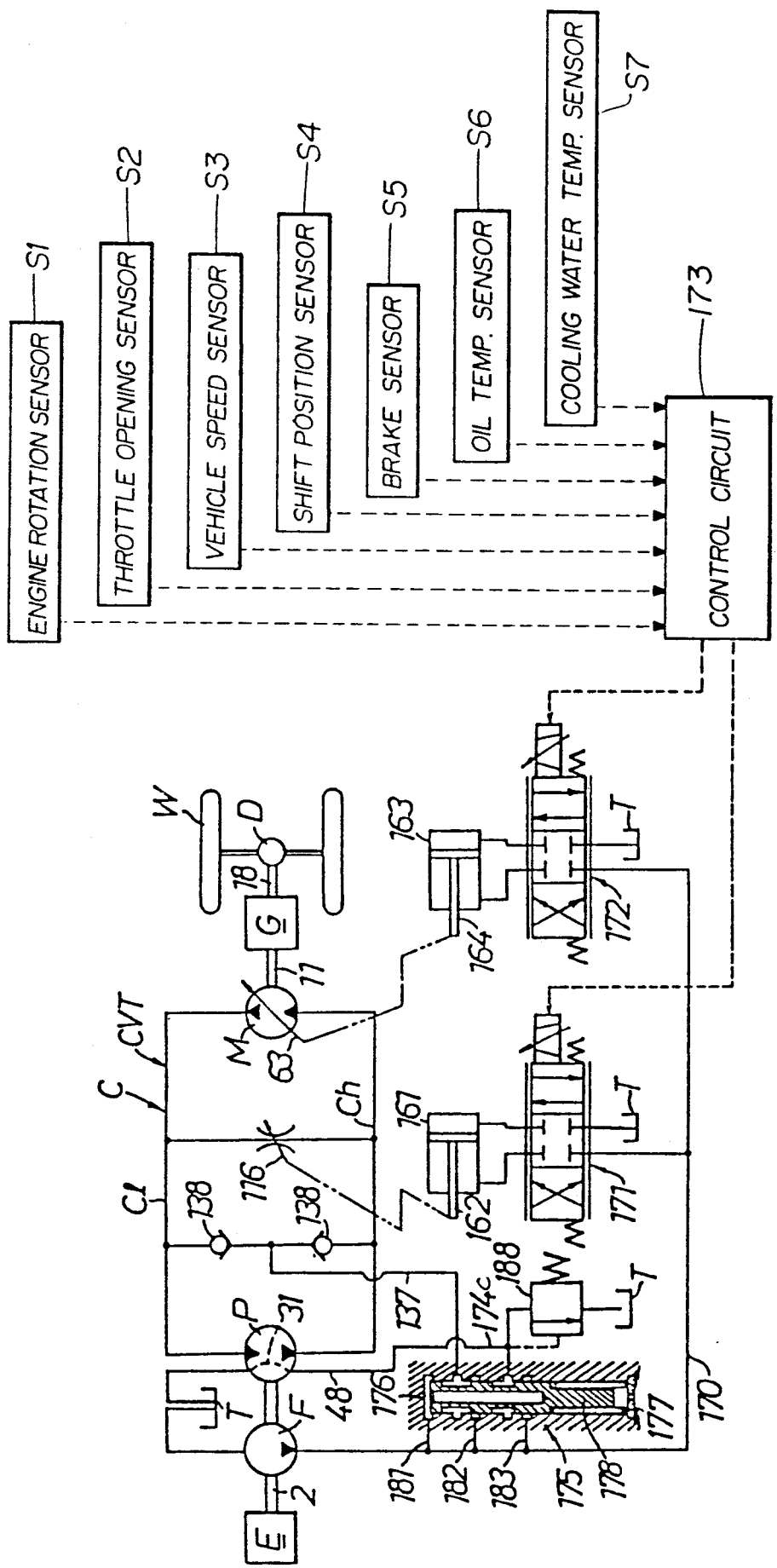
FIG. 10 is a circuit diagram of a hydraulic circuit arrangement of a hydraulically operated continuously variable transmission according to a yet still further embodiment of the present invention.

According to a yet still further embodiment shown in FIG. 10, the release oil passage 174c between the control valve 175 and the chamber 31 is connected to the oil tank T via a relief valve 188 similar to the relief valve 188 shown in FIG. 6.

In the embodiments shown in FIGS. 5 through 10, either the lubricating chamber 75 of the chamber 31 is supplied with lubricating oil from the supply oil passage 170 through the control valve 175. However, it is also possible to provide an embodiment (not shown) in which both the lubricating chamber 75 and the chamber 31 are supplied with lubricating oil from the supply oil passage 170 through the control valve 175.

Although certain preferred embodiments have been shown and described, it should be understood that many changes and modifications may be made therein without departing from the scope of the appended claims.

What is claimed is:

1. An oil flow control apparatus in a hydraulically operated continuously variable transmission, comprising a hydraulic actuator, an auxiliary pump supplying an operating oil under pressure to said hydraulic actuator, a valve for maintaining a relatively constant pressure of said operating oil at said hydraulic actuator, an oil passage connected to said auxiliary pump, said hydraulic actuator, and said valve, a release oil passage connected to said valve, and a replenishing oil passage connected to said valve for supplying replenishing oil to said hydraulic transmission, wherein said valve selectively connects said auxiliary pump to said replenishing oil passage according to the pressure of oil supplied from said auxiliary pump and to said release oil passage according to the pressure of oil supplied from said auxiliary pump.

2. An oil flow control apparatus according to claim 1, wherein said release oil passage is connected to an oil tank through a lubricating chamber of a hydraulic motor of said transmission.

3. An oil flow control apparatus according to claim 1, wherein said release oil passage is connected to an oil tank through a lubricating chamber of a hydraulic pump of said transmission.

4. An oil flow control apparatus according to claim 1, wherein said valve disconnects said oil passage from said replenishing oil passage and from said release oil passage when the pressure of the oil in said oil passage is not greater than a first predetermined level, said valve connects said oil passage to said replenishing oil passage but not to said release oil passage when the pressure of the oil in said oil passage is greater than said first predetermined level but not greater than a second predetermined level, said second predetermined level being greater than said first predetermined level, and said valve connects said oil passage to said replenishing oil passage and said release oil passage when the pressure of the oil in said oil passage is greater than said second predetermined level.

5. An oil flow control apparatus according to claim 4, wherein said release oil passage is connected to an oil tank through a lubricating chamber of a hydraulic motor of said transmission.

6. An oil flow control apparatus according to claim 4, wherein said release oil passage is connected to an oil tank through a lubricating chamber of a hydraulic pump of said transmission.

7. An oil flow control apparatus in a hydraulically operated continuously variable transmission with a hydraulic pump and a hydraulic motor interconnected through a closed hydraulic circuit, comprising an auxiliary pump, an oil passage connected to said auxiliary pump for carrying oil from said auxiliary pump, hydraulic actuator connectable to said oil passage, a replenishing oil passage for supplying replenishing oil to said closed hydraulic circuit, an oil tank, and a valve connected to said oil passage and to said replenishing oil passage for maintaining a relatively constant pressure of oil to said hydraulic actuator, said valve selectively connecting said auxiliary pump to said replenishing oil passage and selectively connecting said auxiliary pump to said oil tank, depending on the pressure of oil in said oil passage.

8. An oil flow control apparatus according to claim 7, wherein said valve connects said auxiliary pump to said replenishing oil passage when the pressure of the oil in said oil passage exceeds a first oil pressure level, and connects said auxiliary pump to said oil tank when the pressure of the oil in said oil passage exceeds a second pressure level.

9. An oil flow control apparatus according to claim 8, wherein said oil tank is connected to said valve through a lubricating chamber of said hydraulic motor.

10. An oil flow control apparatus according to claim 8, wherein said oil tank is connected to said valve through a lubricating chamber of said hydraulic pump.

11. An oil flow control apparatus according to claim 8, wherein said second pressure level is greater than said first pressure level.

12. An oil flow control apparatus according to claim 11, wherein said valve is a spool-type valve.

13. An oil flow control apparatus in a continuously variable hydraulic transmission having a hydraulic pump and a hydraulic motor interconnected by a closed hydraulic circuit, comprising an auxiliary pump for supplying oil under pressure, an oil passage connected to said auxiliary pump, a hydraulic actuator connectable to said oil passage, a replenishing oil passage for supplying replenishing oil to said closed hydraulic circuit, an oil tank, and a valve connected to said oil passage, said replenishing oil passage, and said oil tank for prioritizing the supply of said oil to said hydraulic actuator and to said replenishing oil passage.

14. An oil flow control apparatus according to claim 13, wherein said valve prioritizes the supply of said oil according to the pressure of said oil so that said oil is first supplied to said hydraulic actuator, then if the pressure is great enough, oil is also supplied to said replenishing oil passage, and then if the pressure of oil is greater still, oil is also supplied from said auxiliary pump to said oil tank.

15. An oil flow control apparatus in a hydraulically operated continuously variable transmission with a hydraulic pump and a hydraulic motor interconnected through a closed hydraulic circuit, comprising auxiliary pump means for supplying oil under pressure, a hydraulically operated device connectable to said pump means, a replenishing oil passage for supplying replenishing oil to said closed hydraulic circuit, a lubricating chamber in one of said hydraulic pump and said hydraulic motor, and a valve for maintaining a relatively constant pressure of oil being supplied to said hydraulically operated device and for selectively supplying oil to said replenishing oil passage and to said lubricating chamber.

16. An oil flow control apparatus according to claim 15, wherein said valve connects said pump means to said replenishing oil passage when the pressure of oil at an outlet of said pump means exceeds a first pressure level and said valve connects said pump means to said lubricating chamber when the pressure of oil at said outlet exceeds a second pressure level, said second pressure level being greater than said first pressure level.

17. An oil flow control apparatus according to claim 16, further comprising a relief oil passage connecting said valve and said lubricating chamber, and relief means connected to said relief oil passage for connecting said pump means to an oil tank when the pressure of oil in said relief oil passage exceeds a third pressure level, said third pressure level being lower than said second pressure level.

* * * * *